Figure 1:
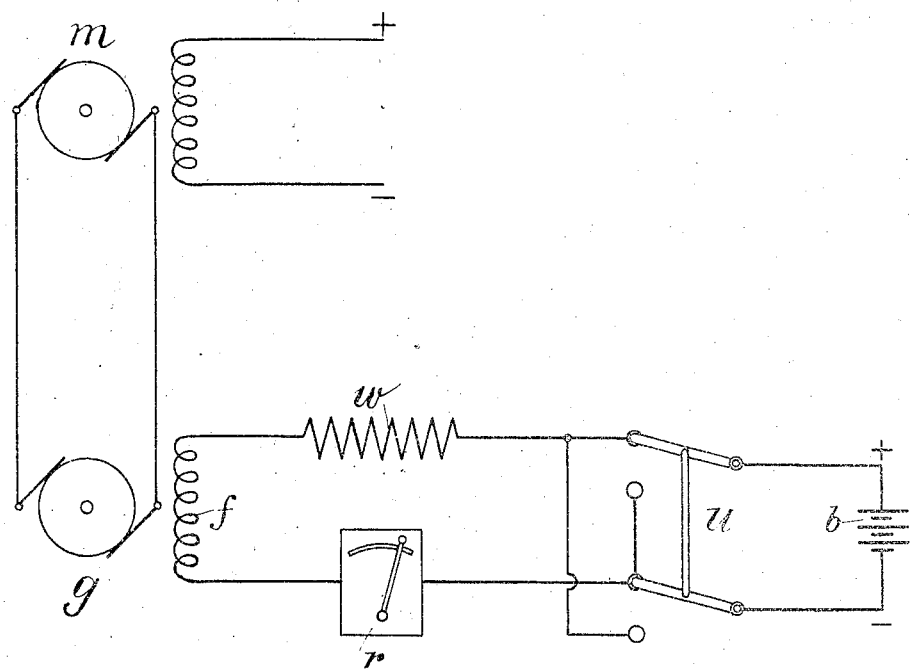

No. 846,422. PATENTED MAR. 5, 1907.
E. OELSCHLÄGER.
DYNAMO ELECTRIC MACHINE.
APPLICATION FILED DEC. 10, 1904.

2 SHEETS—SHEET 1.

No. 846,422. PATENTED MAR. 5, 1907.
E. OELSCHLÄGER.
DYNAMO ELECTRIC MACHINE.
APPLICATION FILED DEC. 10, 1904.

UNITED STATES PATENT OFFICE.

ERNST OELSCHLÄGER, OF CHARLOTTENBURG, GERMANY, ASSIGNOR TO SIEMENS-SCHUCKERT WERKE, GESELLSCHAFT MIT BESCHRÄNKTER HAFTUNG, OF BERLIN, GERMANY, A CORPORATION OF GERMANY.

DYNAMO-ELECTRIC MACHINE.

No. 846,422.     Specification of Letters Patent.     Patented March 5, 1907.

Application filed December 10, 1904. Serial No. 236,259.

*To all whom it may concern:*

Be it known that I, ERNST OELSCHLÄGER, a subject of the German Emperor, residing in Charlottenburg, near Berlin, Germany, have invented certain new and useful Improvements in Dynamo-Electric Machines, of which the following is a specification.

My invention has for its object to accelerate the excitation of electrical machines by the use of a current of high initial strength without involving the use of any special switching mechanism. In such machines as usually arranged the exciting-current is on the first closing of the circuit of small value, because of the great inductance of the circuit, and requires an appreciable time to attain its normal full value even when all the iron of the magnetic circuit is laminated. The resulting tardiness in the excitation of the machine might be done away with by raising the exciting-pressure by means of a suitable switch mechanism; but this method involves somewhat complicated apparatus and is unreliable in operation.

According to the present invention the voltage available for excitation is arranged to be higher than is necessary to provide the normal exciting-current, the excess voltage being taken up by an external resistance of small inductance when the current has reached its steady value. The inductance of the circuit being thus smaller in proportion to the ohmic resistance, taking into consideration the higher voltage available, the initial exciting-current will be greater, and it will rapidly reach its full value after the exciting-circuit is completed or the exciting-voltage applied.

The apparatus forming the subject-matter of my present invention is especially adapted for use in electrical-power plant in which large masses are to be accelerated quickly or their direction of motion reversed quickly—such, for instance, as electrically-driven reversible rolling-mills, the steering-gear for ships, gun-laying mechanisms, hauling-motors for mines, and other mechanisms, the driving of which is effected by means of starting-machines. These starting-machines, as is well known, are usually employed by including the electromotor which is to be started or regulated in the circuit of the starting-current generator, whereupon the voltage of the current-generator is varied between zero and a maximum value, this being effected by varying the excitation of the starting-current generator.

Electromotors which serve for driving working machines are often driven and regulated by means of the so-called "starting-dynamo machines." These starting-machines are secondary machines carrying direct current. The motor has its field excited from a separate source; but this armature is connected in series with the armature of the starting-machine. The change in velocity and in the direction of rotation of the motor and also the starting and stopping is effected by merely changing the tension or excitation of the starting-machine, which latter is separately excited just as the motor. Such starting-machines are of great advantage when electromotors have great working capacities and must be started and stopped often, or when their velocity or their direction of rotation must be frequently changed. The advantage consists in the fact that the regulation of currents having great intensity is effected by means of apparatus carrying current of low intensity only. In such instances, however, it is necessary to rapidly change the intensity of the exciting-current of the starting-machine and, for instance, bring the excitation from its maximum value to zero in a very short time, and immediately after bring it from zero to its maximum value in the opposite direction by reversing the exciting-current. This, however, cannot be done in the ordinary machines, because by reason of the high self-induction of the magnet-coils it always takes a comparatively long time to bring the magnetization up to the desired degree. A measurement of this time is expressed by the time-constant T, which is proportional to the self-induction coefficient L of the circuit divided by the total resistance of the circuit—that is to say $$T = \frac{L}{W}.$$

This equation shows that it is possible to change the time either by altering the self-induction or by altering the resistance of the circuit.

According to the present invention the time-constant $T$ is decreased by increasing the resistance of the circuit and correspondingly increasing the excitation tensions, while the self-induction is left unchanged. For this purpose the excitation-coil is of such dimensions that it will obtain its normal current at a part of the available tension, while the surplus of the tension is taken up by a constant resistance of very small self-induction.

Figure 2:
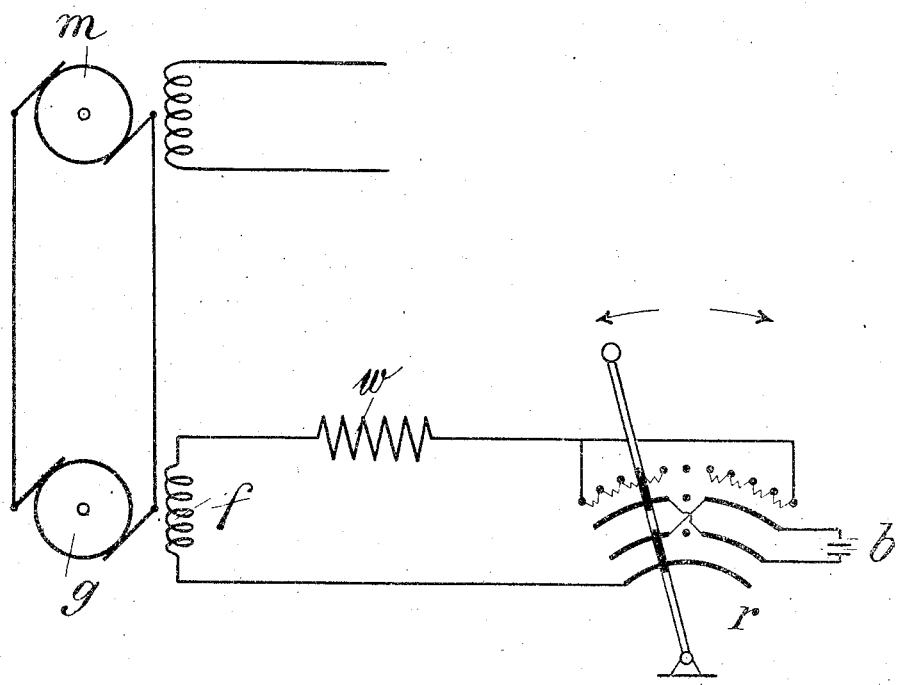

Figures 1 and 2 show diagrammatically two forms of my invention. In Fig. 1, $g$ is the armature of the starting-dynamo machine which is inserted in series with the motor-armature $m$. The field-coil $f$ of the starting-dynamo machine is supplied with current from a special current source $b$. The current flows from $b$ to the switch $u$, from there over the fixed resistance $w$ of small inductance to the field-coil $f$, and from there over the regulation resistance $r$ and the switch $u$ back to the current source $b$. In Fig. 2 the resistance $r$ and the switch $u$ are combined into a single apparatus $r$. The lever of the regulator $r$ is the so-called "controlling-lever." In the central position the current source is cut off. If the lever is moved to the right or to the left, the current flows in one direction or the other around the field-magnet and its intensity can be changed from zero to a maximum.

In operating reversible mills, for example, by means of starting-machines it is necessary to start as rapidly as possible, then to bring the machine to rest, and then to reverse. In large rolling-mills, which consume as high as several thousand horse-power, there may be, for example, as many as eight reversals a minute, so that for the starting only one or two seconds may be available.

By the employment of my improved apparatus for the rapid excitation of the starting-machine this difficulty, which has heretofore been met in the operation of reversible mills by electric power, is solved in a simple and reliable manner. For example, the exciting-winding of the starting-current generator is arranged for one hundred and ten volts, while the exciting-voltage is substantially higher than this, the excess voltage being taken up by a resistance of small inductance, as above described.

Having thus described my invention, what I claim as new, and desire to secure by Letters Patent is—

1. In a motor-starter, the combination of a continuous-current motor, a continuous-current starting-dynamo in series with said motor, a permanent resistance of small inductance in series with the field of said dynamo, and means for varying and reversing the current in the field of said dynamo.

2. In a motor-starter, the combination of a motor, a generator in series therewith, a fixed resistance of small inductance in series with the field of said generator, means for supplying current to said generator-field, and means for causing the tension of the current supplied to be in excess of the tension for which the generator-field is wound.

3. In a motor-starter, the combination with a motor, a generator in series therewith, a fixed resistance of small inductance in series with the generator-field, means for supplying current to said field, and means for causing the tension of said current to be sufficiently in excess of the tension for which the generator-field is wound to compensate for the loss of tension in said fixed resistance.

ERNST OELSCHLÄGER.

Witnesses:
HENRY HASPER,
WOLDEMAR HAUPT.